(12) United States Patent
Kjellander et al.

(10) Patent No.: US 6,736,161 B2
(45) Date of Patent: May 18, 2004

(54) PRESSURE REGULATING VALVE

(75) Inventors: Per-Olof Kjellander, Torslanda (SE);
Staffan Rengmyr, Gvteborg (SE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 10/063,298

(22) Filed: Apr. 9, 2002

(65) Prior Publication Data

US 2002/0144734 A1 Oct. 10, 2002

(30) Foreign Application Priority Data

Apr. 9, 2001 (EP) .............................. 01200307

(51) Int. Cl.[7] .............................................. F16K 17/04
(52) U.S. Cl. .................. 137/538; 137/514.5; 137/454.5
(58) Field of Search ................ 137/514.3, 538, 137/514, 514.5, 454.5

(56) References Cited

U.S. PATENT DOCUMENTS

| 2,305,519 A | * | 12/1942 | Dunmire ...................... 137/538 |
| 3,185,137 A | * | 5/1965 | Dreyer ...................... 137/454.5 |
| 4,161,189 A | * | 7/1979 | Mueller, Jr. ................. 137/538 |
| 4,657,043 A | * | 4/1987 | Ampferer et al. ............ 137/538 |
| 4,682,531 A | * | 7/1987 | Mayer ....................... 137/514.5 |
| 5,769,115 A | | 6/1998 | Ohsaki et al. |
| 6,116,272 A | * | 9/2000 | Kratzet ........................ 137/538 |
| 6,352,085 B1 | * | 3/2002 | Morita et al. ................ 137/538 |
| 2001/0022195 A1 | * | 9/2001 | Kazaoka ...................... 137/538 |

FOREIGN PATENT DOCUMENTS

| EP | 0 388 922 A2 | 3/1990 |
| EP | 0 460 299 A1 | 12/1990 |
| JP | 11-270725 A | 10/1999 |

* cited by examiner

Primary Examiner—Gerald A. Michalsky

(57) ABSTRACT

The invention relates to a pressure regulating valve comprising a valve body having one or more inlet openings and one or more outlet openings for a pressurized medium, an internal cavity connecting said inlet and outlet openings and a piston which is in contact with a valve seat between inlet and outlet and is axially slidable in the cavity in the valve body against a spring, which biases the piston to a closed position, whereby the valve opens when a predetermined pressure acts on the piston. The valve body is provided with an opening at its outlet side, where the cross-section of the opening is smaller that the cross-section of the cavity and which opening is in connection with a volume limited by the piston and the lower section of the internal cavity, whereby the pressure drop across the valve dampens variations in the volume.

6 Claims, 4 Drawing Sheets

PRESSURE REGULATING VALVE

BACKGROUND OF INVENTION

The invention relates to a pressure regulating valve for a pulsating pressurized medium, wherein dampening of oscillations in the valve is desired.

Pressure regulating valves for pressurized systems with mainly static or more or less continuously varying pressure levels are commonly known. Such valves are not always suitable for use in systems exposed to a pulsating flow/pressure with varying frequencies. In cases where a valve is spring loaded towards an open or closed position, the spring-loaded component of the valve may start to oscillate. Simple valves of this type will merely comprise a valve seat and a spring-loaded spherical valve body. If, for instance, a spring-loaded spherical valve body or a piston in the valve should begin to oscillate, the function of the valve will be disturbed. Due to this, the entire system of which the valve is a part may be disturbed or caused to fail. Examples of other sources of disturbances that may cause the valve to oscillate are engine vibrations or other valves, causing pressure pulses when opening or closing.

One field of application for such a valve is for cooling of pistons in internal combustion engines. Under certain operating conditions, such as high load, it may be necessary to cool the pistons, which is usually done by spraying oil onto the underside of each piston. Such a solution is shown in EP-A1-0 460 299. A problem with this solution is that the oil pump supplying oil under pressure delivers a pulsating pressure, especially if a gear pump or duo-centric pump is used. Hence, the piston described in the above document may start to oscillate under certain conditions. This type of oscillation may cause increased valve wear and noise as well as interruptions of the flow of oil to the piston cooling arrangement.

SUMMARY OF INVENTION

The invention aims to minimize the oscillations in pressure regulating valves. This is achieved by means of a valve comprising a valve body provided with one or more inlet openings and one or more outlet openings for a pressurized medium, which inlet and outlet openings are connected by an internal cavity. A piston abuts a valve seat between said inlet and outlet openings and is axially slidable against a spring in said cavity in the valve body. The piston is spring loaded towards its closed position, whereby the valve opens when a predetermined pressure actuates the piston. Dampening of oscillations is achieved by providing the outlet side of the valve body with an opening having a surface smaller than the cross-section of the cavity. Said opening enables pressurized medium from the outlet openings to act on the piston in the same direction as the spring when the valve is opened.

By selecting a suitable diameter for the opening, oscillations of the pistons can be dampened to the frequency in the pressurized medium close to or equal to the natural resonance frequency of the system.

The spring biasing the piston towards its closed position is preferably enclosed by two more or less cup-shaped parts, whereby the piston makes up the first part and the second part constitutes a component closing the cavity. Said component consists of a washer, or a similar part, provided with an opening. The opening is in connection with the outlet side of the valve. It is, of course, possible to provide further embodiments of both the piston and the closing component.

The inlet and outlet openings of the valve are preferably made up from axially separated, radial openings between the outer periphery and the internal cavity of the valve body. The number and cross-section of the inlet and outlet openings can be selected so that a predetermined pressure drop across said openings is obtained. In a preferred embodiment, it is desired to keep the pressure drop across said openings as small as possible, in order to limit the pressure loss in the system. It is also possible to assemble the valve in a cavity having connections for pressurized medium inlets and outlets, to the corresponding inlet and outlet openings in the valve. The outer surface of the valve is suitably provided with circular grooves in connection with said inlet and outlet openings in the valve. The outer radial surfaces of the valve can also be provided with threaded sections for mounting the valve in said cavity.

If the valve is to be placed in the same flow conduit it is intended to regulate, the inlet opening may instead be shaped in an axial direction. It is for instance possible to shape the bore for the piston in the valve body as a through bore.

An advantage of the above invention is increased piston durability, reduced noise, and improved distribution of oil to the piston cooling arrangement.

The above advantages and other advantages, objects and features of the present invention will be readily apparent from the following detailed description of the preferred embodiments when taken in connection with the accompanying drawings.

BRIEF DESCRIPTION OF DRAWINGS

The objects and advantages described herein will be more fully understood by reading an example of an embodiment in which the invention is used to advantage, referred to herein as the Description of Preferred Embodiment, with reference to the drawings, wherein.

DETAILED DESCRIPTION

Figure 1:
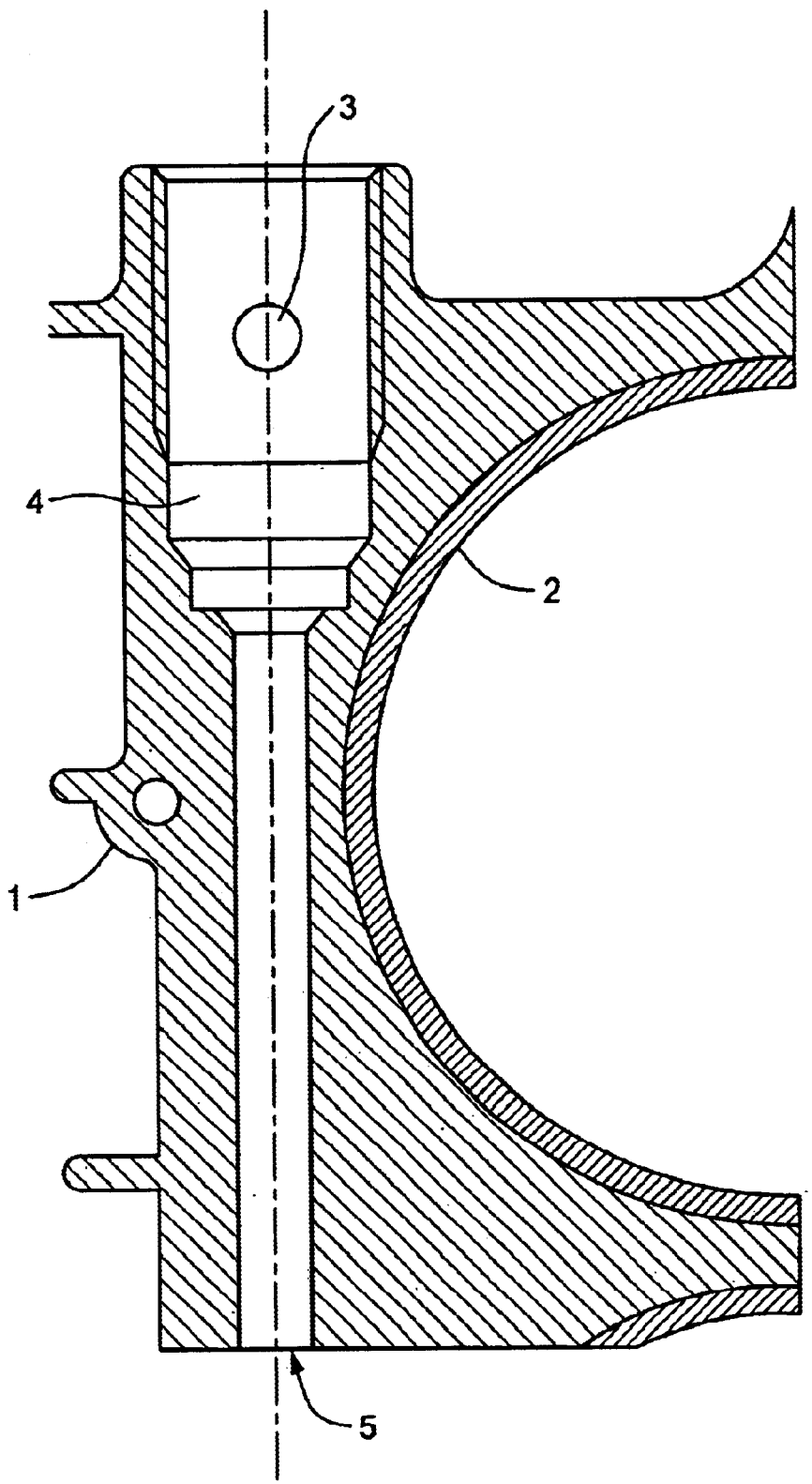
FIG. 1 is a known cooling oil conduit for a pressure regulating piston cooling valve.

FIG. 1 shows a cross-section through an engine block 1 for a combustion engine, having a number of cylinders provided with cylinder linings 2 and pistons (not shown) to be cooled. The engine block is provided with one or more drilled cooling oil conduits 3, 5, each supplying one or more nozzles with oil, which is sprayed onto the underside of the pistons in order to cool them.

The cooling oil conduit as shown in FIG. 1 has an inlet conduit 3, a cavity 4 in which a pressure-regulating valve is mounted, and an outlet conduit 5. When the pressure in the inlet conduit exceeds a spring force, the valve opens and oil is supplied to the nozzles for cooling the pistons.

A valve according to an embodiment of the invention can either be mounted in a designated recess in the engine block, or be mounted in an existing recess, which has been bored or otherwise modified to the correct dimensions.

Figure 2:
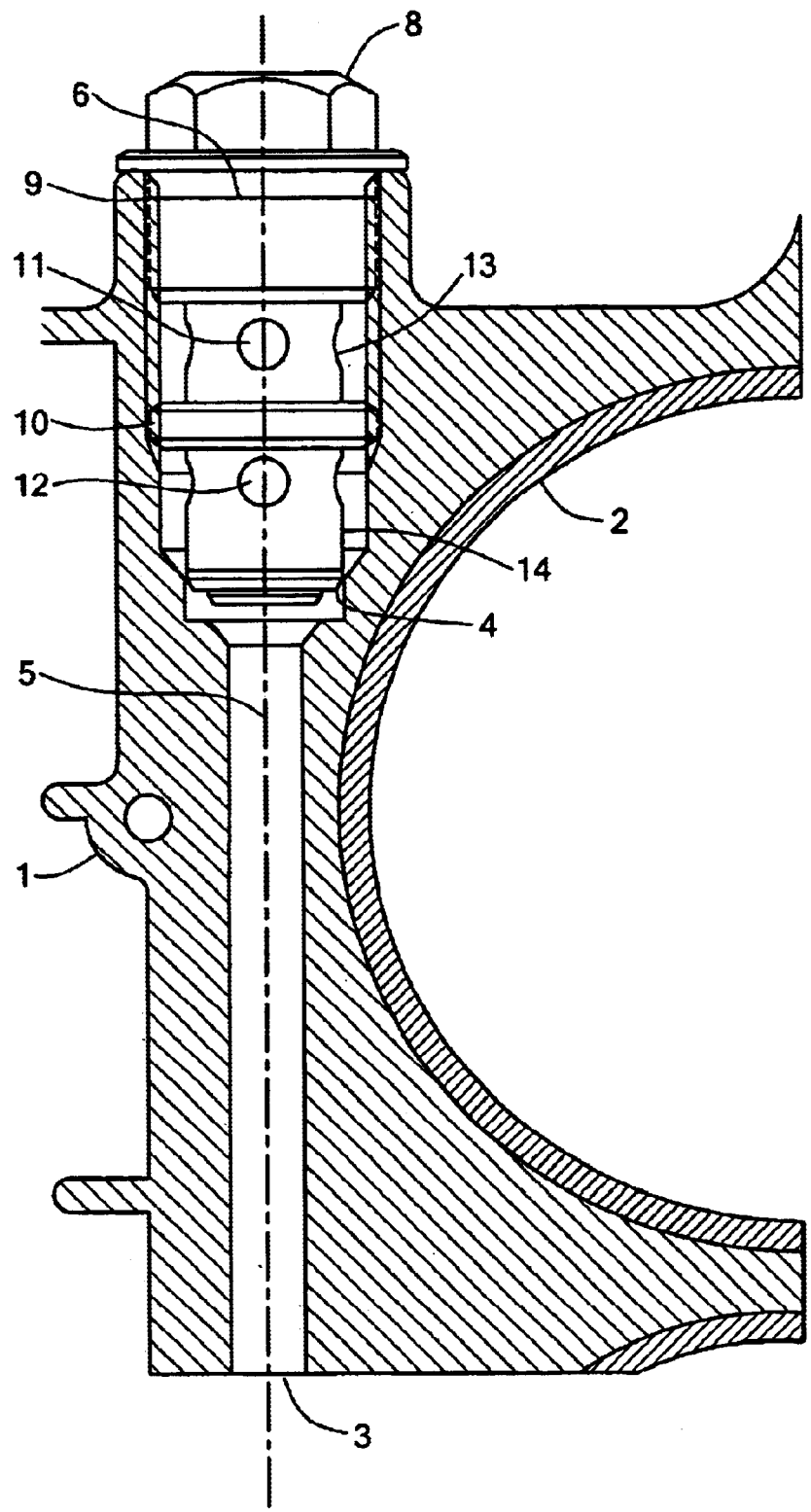
FIG. 2 is a cooling oil conduit for a pressure regulating piston cooling valve according to the invention.

FIG. 2 shows a valve 6 that has been mounted in an existing recess, which has been bored and displaced slightly in order to maintain a suitable distance from the cylinder lining 2. The valve body is provided with threaded sections 9, 10 on its outer periphery, so that it can be screwed into and attached in the recess. The valve can also be mounted using force fitting, but the method of mounting is not relevant to the function of the valve.

The valve is provided with inlet openings 11 and outlet openings 12 respectively, which are in connection with the inlet conduit 3 and the outlet conduit 5 in the engine block respectively. In order to achieve communication between the conduits in the engine block 1 and the valve body 6, the latter is provided with circumferential grooves, or roundabout or partial peripheral recesses 13, 14, in the proximity of its inlet and outlet openings 11, 12.

According to the embodiment of FIG. 2, the valve body has an outer threaded section 9, which seals the recess 4 from the atmosphere, and an inner threaded section 10, which seals between the grooves/recesses 13, 14 in the valve body 6 for the inlet and outlet openings 11, 12 respectively.

Figure 3:
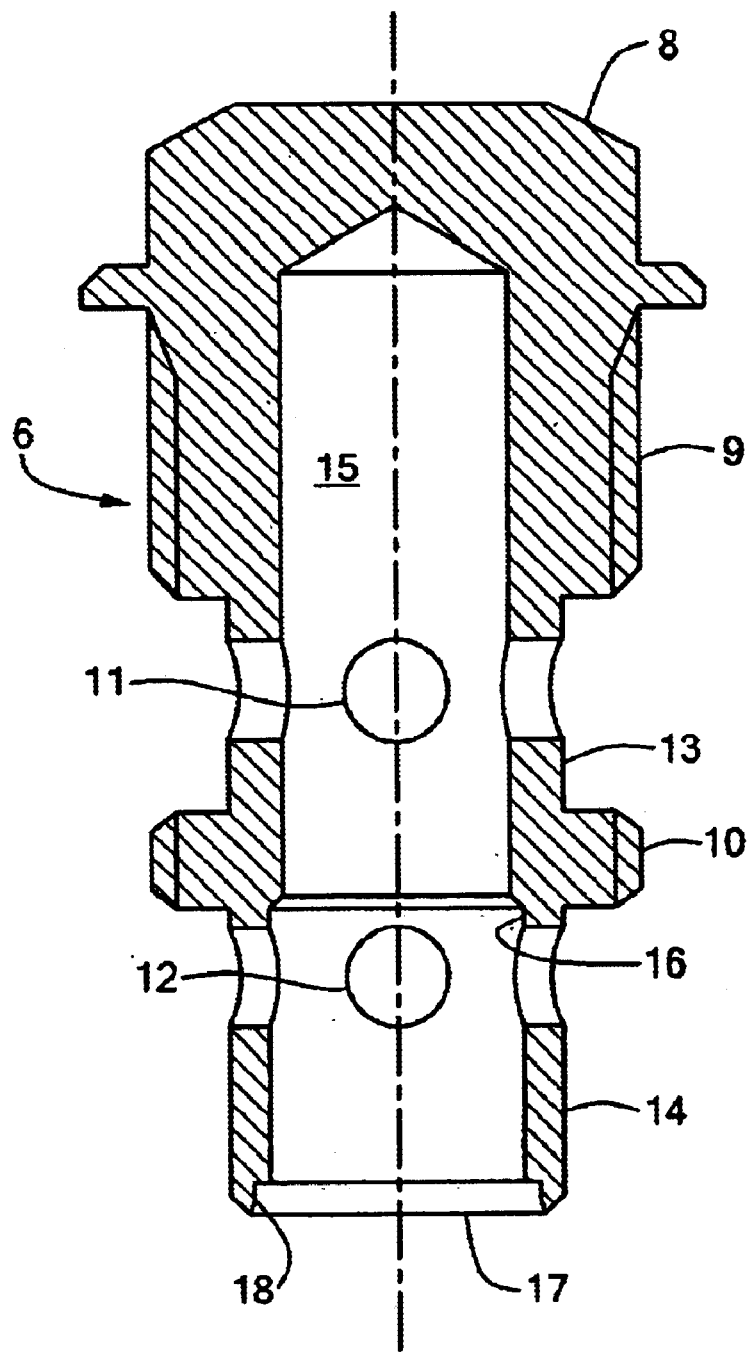
FIG. 3 is a cross-section through a valve body for a valve according to the invention.

FIG. 3 shows a cross-section through the valve body 6, which in the current embodiment has four inlet and outlet openings 11, 12. All these openings open out into an internal cavity 15 in the valve body. The cavity 15 is provided with a seat for a piston between the inlet and outlet openings 11, 12, preferably near the outlet openings 12. The cavity is preferably shaped as an axial bore, which opens out towards the outlet side 17 of the valve body and which is provided with are radial groove 18. This groove 18 is used for positioning and attaching a washer that makes up one end surface of the valve body.

Figure 4:
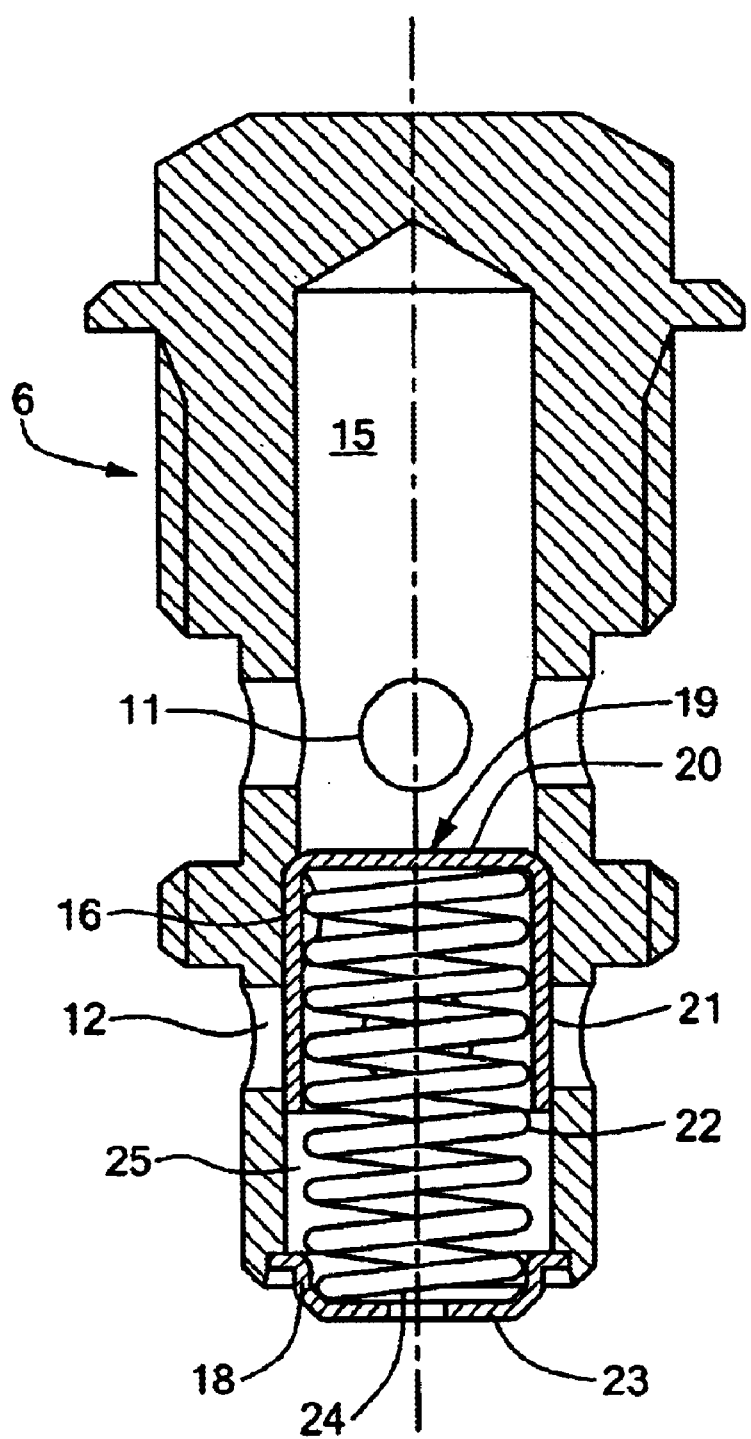
FIG. 4 is a cross-section through an assembled valve for mounting in a cooling oil conduit.

A cross-section of a valve body 6 ready for mounting in an oil conduit is shown in FIG. 4. The valve body is provided with a piston 19, which is in contact with the valve seat 16 in the cavity 15. The piston 19, which is mainly cup-shaped, has a flat surface 20 facing the inlet openings 11 and a cylindrical surface 21 facing the outlet openings 12. A spring 22 maintains the piston in a closed position against the seat 16. The other end of the spring 22 is in contact with a washer 23, which has a cup-shaped portion in order to position the spring and a radial edge to allow it to be mounted in the groove 18 in the valve body. The seat 16 is shaped as a small radial step in the cavity, which helps to reduce the pressure drop across the valve. The distance between the lower part of the piston 19 and the washer 23 is preferably selected so that all the outlet openings 12 are exposed when the piston reaches its lowest position.

The washer 23 is provided with an opening 24 having a predetermined diameter.

This diameter is selected to give the valve its desired properties, mainly for dampening oscillations of the piston 19. The cylindrical surface of the piston 19 is in sealing contact with the seat 16 in the wall of the cavity 15 and covers the outlet openings in its closed position. If the oil pressure in the cavity 15, acting on the upper surface of the piston 19, exceeds the spring force of the spring 22, the piston will be displaced to expose the outlet openings 12 wholly or in part. It is then possible for oil to flow through the outlet openings 12 and in through the opening 24 to reach the back of the piston 19. The washer 23 and the piston 19 encloses a volume 25 which will increase or decrease as the piston 19 moves in the direction of the spring 23 in the cavity 115. By dimensioning the opening 24 to give an adapted pressure drop, changes in the size of the volume 25 will counteract oscillations in the piston 19 and its spring 23.

The function of the valve is as follows. Oil pressurized by the oil pump flows from the oil conduit 3, into the groove 13 adjacent the inlet openings 11 and through said openings. When the oil pressure in the cavity 15 exceeds a certain level, the piston 19 will begin to open against the spring 22. The oil pressure acting on the piston 19 determines its degree of opening and consequently how much the outlet openings 12 will be exposed. As the valve opens, oil will flow through the wholly or partially exposed outlet openings 12 to the outlet conduit 5 towards one or more piston cooling nozzles.

Under certain circumstances pressure variations in the inlet conduit 3, engine vibrations or other disturbances may cause the piston 19 to start oscillating. One cause for this can be that a gear pump, or a similar means, is used for pumping the oil, which will give a pulsating flow with rapid pressure changes. If the frequency of the pressure pulses is near or equal to the resonant frequency of the piston 19 and its associated spring 22, the piston will oscillate. However, the pressure pulses will propagate to the back of the piston 19, via the outlet openings 12 and the opening 24 in the washer 23. Consequently, the same pressure pulses, albeit with a slight time shift, will counteract and dampen the oscillations of the piston.

The factors influencing the resonant frequency of the valve is the mass of the piston and the stiffness of the spring. The latter is the most important, as the stiffness is chosen with respect to the pressure at which the valve is to open, the clamping length in the valve, etc. In order to obtain the desired dampening effect, the opening 24 in the washer 23 must be dimensioned accordingly.

According to one embodiment, the piston has a diameter of 11 mm and the opening 24 a diameter of 1 mm. The spring is then dimensioned for an opening pressure that gives a desired cooling effect on the engine pistons. The choice of opening pressure is influenced by several factors, such as engine cylinder volume, maximum number of revolutions and power output. The opening pressure for a piston cooling valve according to the invention can be between 0,8–3 bar, preferably between 1–1,5 bar. As the washer 23 is replaceable, the valve can easily be adapted for dampening various frequencies, by simply changing the size of the opening.

Correspondingly, the valve can be adjusted for different opening pressures by simply replacing the spring 22.

The valve can also be used as a reducing valve, that is, to open and thereby limit the pressure level in a hydraulic system to a predetermined pressure. Typical opening pressures for such reducing valves are 2–10 bar.

The mounting of the washer is not relevant to the invention per se, but can be made using a locking washer, a threaded component, or simply by snapping the washer itself into the groove 18. Attachment of an exchangeable, threaded component provided with an opening can be achieved in several ways. It is, for instance, possible to machine a through hole in a disc-shaped body having external threads, cooperating with internal threads in the outlet side 17 of the cavity 15. The spring 22 will thereby be in direct contact with the disc-shaped body. Said body can either be screwed against a fixed stop, or be adjustable by screwing it into said internal threads until the desired distance from the seat 16 of the piston is reached. The latter alternative can be used for adjusting the force of the spring that controls the required opening pressure. The disc-shaped body can be locked in position by means of self-locking threads or some other suitable locking or blocking means.

This concludes the description of the invention. The reading of it by those skilled in the art would bring to mind many alterations and modifications without departing from the spirit and the scope of the invention. Accordingly, it is intended that the scope of the invention be defined by the following claims.

What is claimed is:

1. A pressure regulating valve, comprising:
   a valve body having an axis, comprising:
      at least one inlet opening in a sidewall of the valve body, such inlet opening extending along an inlet axis, such inlet axis being disposed perpendicular to the axis of the body;
      at least one outlet opening in a sidewall of the valve body, such outlet opening extending along an outlet axis, such outlet axis being disposed perpendicular to the axis of the body;
      an internal cavity connecting said inlet and outlet openings, such inlet and outlet openings extending from the internal cavity to a region external of the valve body;
      a bottom portion having an opening with a cross-section that is smaller than a cross-section of said internal cavity;
      a valve seat positioned in said internal cavity of said valve body between said inlet and outlet openings;
      a piston slidable along the body axis in said internal cavity; and
      a spring, one end of which maintains said piston in a closed position against said valve seat wherein the other end of said spring is in contact with said bottom portion of said valve body;
   wherein the pressure pulses in a pressurized medium entering said valve are propagated through said outlet opening and said bottom portion opening, to the back of said piston in order to dampen piston oscillations;
   wherein said piston is cup-shaped;
   wherein said inlet and outlet openings are separated along the body axis in said valve body between its outer periphery and said internal cavity; and
   wherein the opening in the bottom extends along an axis co-directional with axis of the body and the motion of the piston, such opening in the bottom extending from the internal cavity to a region external of the valve body.

2. The pressure regulating valve according to claim 1, wherein said valve is mounted in a recess which is provided with connections for an inlet and an outlet for a pressurized medium for the corresponding inlet and outlet openings in said valve.

3. The pressure regulating valve according to claim 2, wherein an outer surface of the valve is provided with radial grooves in connection with said inlet and outlet openings in said valve body.

4. The pressure regulating valve according to claim 3, wherein the outer surface of said valve is provided with threaded sections for mounting in said recess.

5. The pressure regulating valve according to claim 4, wherein said valve is a piston cooling valve for an internal combustion engine.

6. The pressure regulating valve according to claim 4, wherein said valve is a reducing valve for a hydraulic system.

* * * * *